Leslie J. Soileau
INVENTOR.

Sept. 29, 1959
L. J. SOILEAU
2,906,215
SWEET POTATO VINE PLANTER
Filed Aug. 21, 1953
3 Sheets-Sheet 2
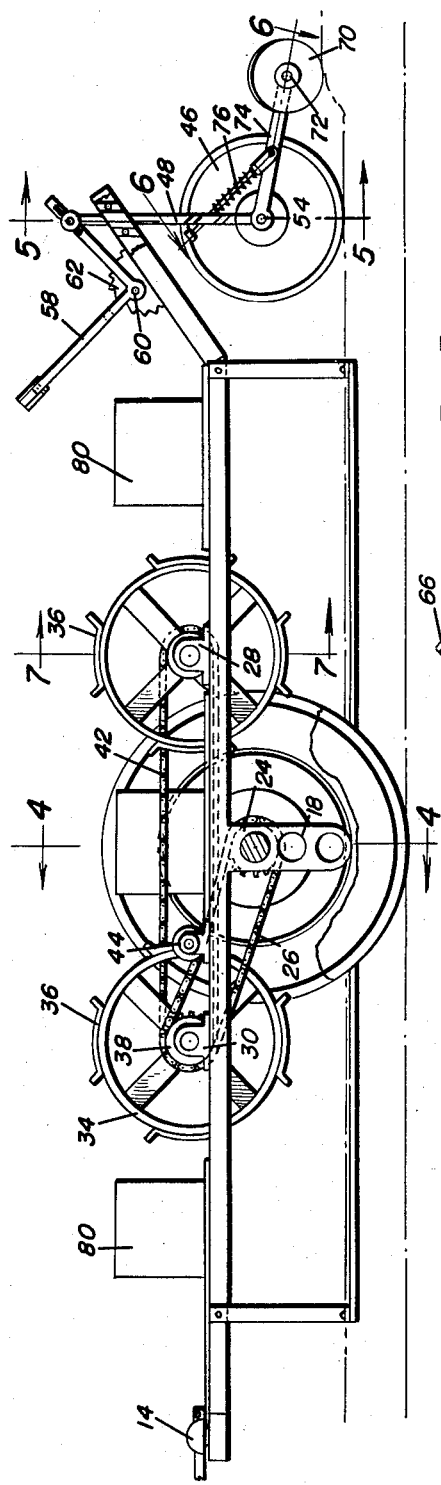
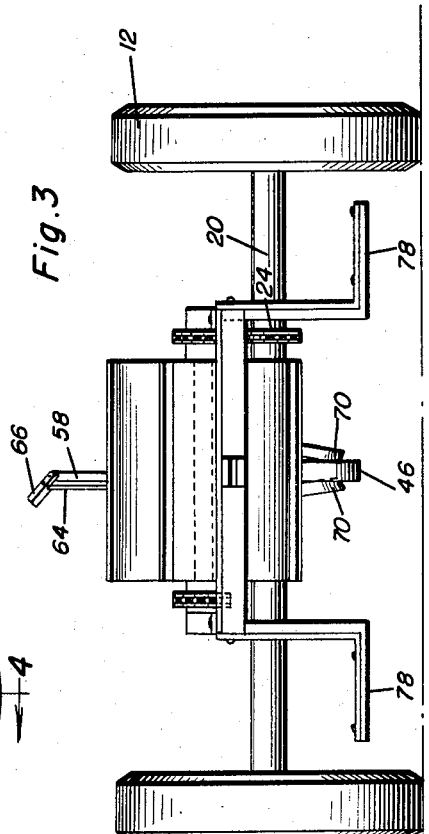
Leslie J. Soileau
INVENTOR.

Sept. 29, 1959
L. J. SOILEAU
2,906,215
SWEET POTATO VINE PLANTER
Filed Aug. 21, 1953
3 Sheets-Sheet 3
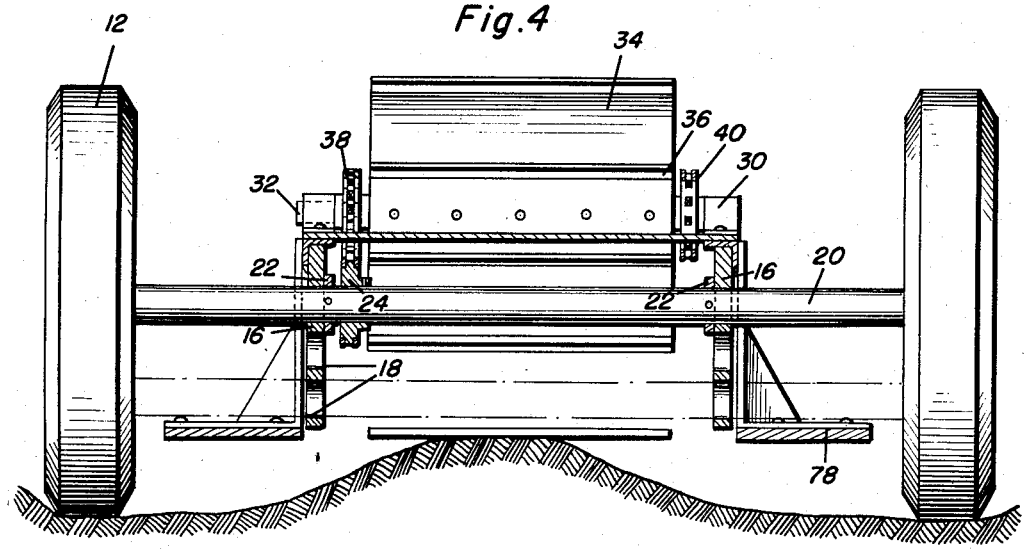
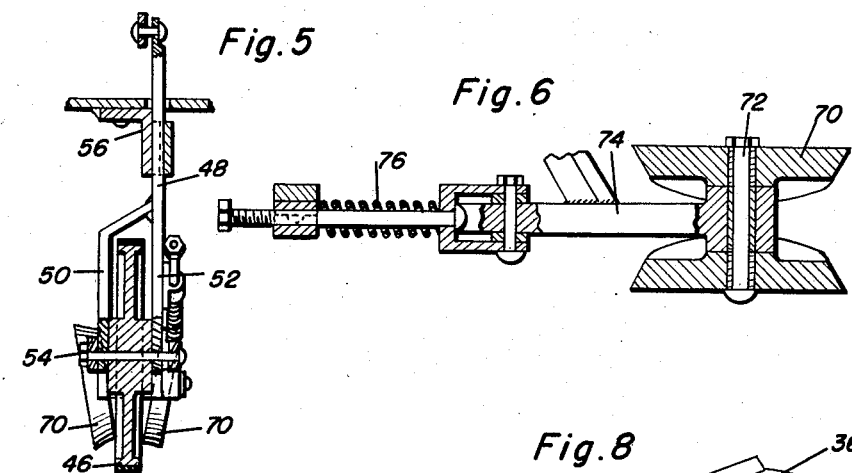
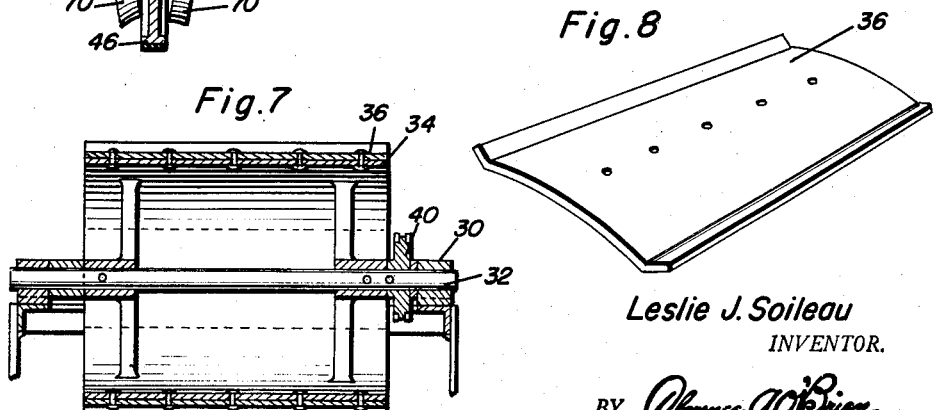
Leslie J. Soileau
INVENTOR.

2,906,215

SWEET POTATO VINE PLANTER

Leslie J. Soileau, New Iberia, La.

Application August 21, 1953, Serial No. 375,612

3 Claims. (Cl. 111—3)

This invention relates to a novel sweet potato vine planter and more specifically provides for the setting of sweet potato vines into rows in uniformly spaced relation.

An object of this invention is to provide a sweet potato vine planter for inserting the vines into the soil and covering a portion of the vines with soil thereby assuring the vines of sufficient soil for root taking.

Another object of this invention is to provide a vine planter with means for pushing the vine into the ground wherein said means is adjustable to determine the depth into the ground which the vines are pushed.

An important object of this invention is to provide a vine planter wherein means are provided to adjust the planter for setting vines in different height rows.

A still further object of this invention is to provide a planter that is simple in construction and will set the vines in uniform manner wherein the distance between adjacent vines may be adjusted.

These together with other objects and advantages which will become subsequently apparent reside in the details of construction and operation as more fully hereinafter described and claimed, reference being had to the accompanying drawings forming a part hereof; wherein like numerals refer to like parts throughout, and in which:

Figure 2 is a side elevation of the structure of Figure 1 showing details of the drive wheels, the plant setting drums, and the plant pushing and covering means;

Figure 3 is a front elevation view taken from the left-hand side of Figure 2 showing the general arrangement of the operator platforms and the relationship of the vine pushing and covering means;

Figure 4 is a transverse sectional view taken substantially along section line 4—4 of Figure 2 showing details of the drive means for the drums;

Figure 5 is a fragmental section taken substantially along section line 5—5 of Figure 2 showing details of the vine pushing disc;

Figure 6 is a top plan section taken substantially along section line 6—6 of Figure 2 showing details of the vine covering discs;

Figure 7 is a fragmental transverse elevation section view taken substantially along section line 7—7 of Figure 2 showing details of one of the plant setting drums; and Figure 8 is a detailed perspective view showing the structure of one of the plant setting troughs.

Figure 1:
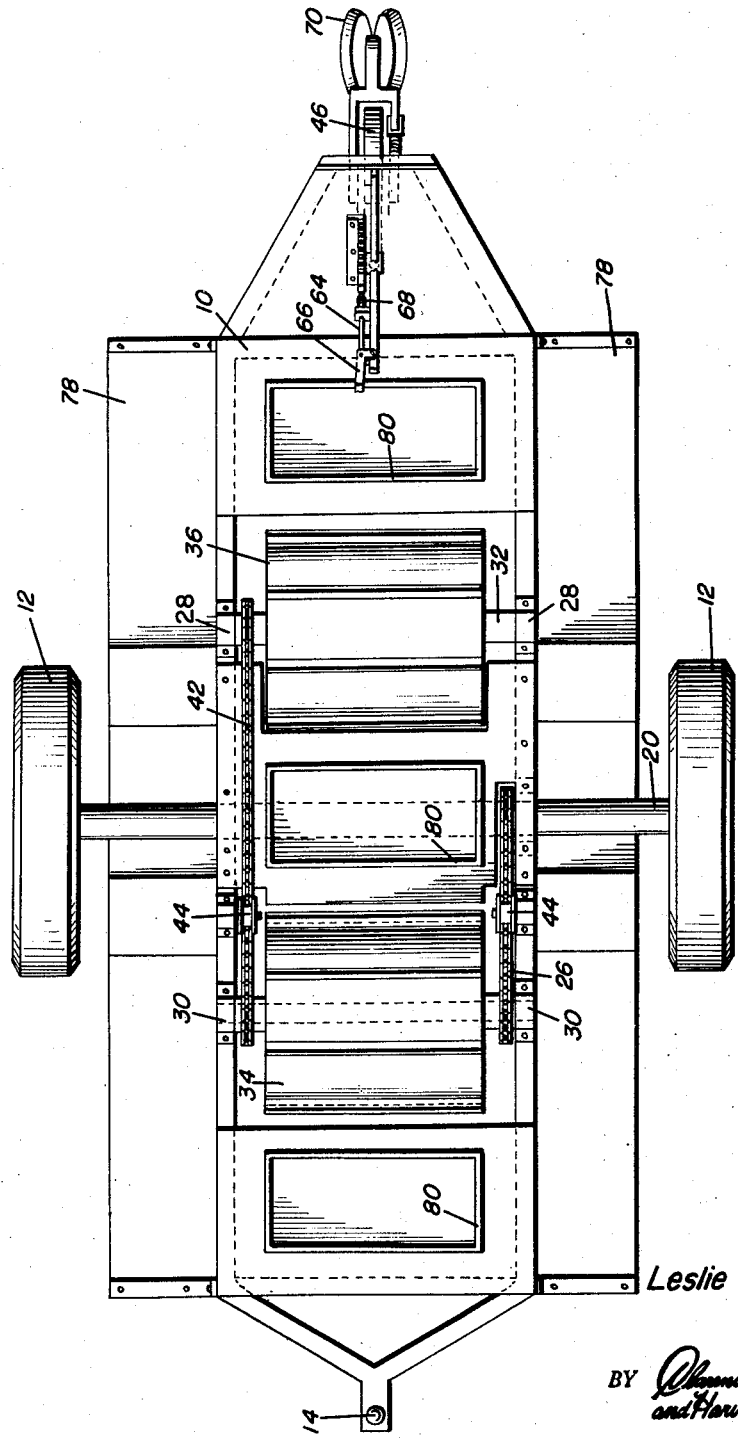
Figure 1 is a top plan view of the vine planter showing the general structure of this invention.

Referring now more specifically to Figures 1 and 2 of the drawings, it will be seen that the numeral 10 generally designates a frame provided with a pair of ground engaging wheels 12 and a ball and socket hitch 14 for attachment to a tractor (not shown) or other suitable pulling means.

Now referring more specifically to Figures 1 through 4, it will be seen that the frame 10 is provided with a pair of depending brackets 16 having a plurality of axle receiving apertures 18 for receiving an axle 20 which is secured at its outer ends to the ground engaging wheels 12. Adjustably secured to the axle 20 is a pair of abutment members 22 which bear against the inner surface of the brackets 16 thereby orientating the axle 20 in transverse relation to the frame 10. Between the abutment members 22, a drive sprocket 24 is secured to the axle 20 which sprocket 24 engages a drive chain 26.

Disposed on the upper surface of the frame 10, on opposite longitudinal sides of the depending brackets 16 are two pairs of bearing blocks 28 and 30 for rotatably receiving a drum axle 32 which supports a drum 34. Around the periphery of each drum 34 are a plurality of trough-like members 36 which are substantially channel-shaped and elongated with the bight portion of the channel having a complemental curvature to that of the periphery of the drum 34 and the troughs 36 are uniformly spaced about the outer periphery of each drum 34. One of the drums 34 and its axle 32 has a pair of sprockets 38 mounted thereon with one of said sprockets being in alignment with the drive sprocket 24 and the other of said sprockets 38 in alignment with a sprocket 40 mounted on the second drum axle 32 and being driven by a sprocket chain 42.

As the ground engaging wheels 12 rotate, thereby rotating the axle 20, driving sprocket 24 and driving chain 26, the two drums 34 will be rotated through the drive pulleys 38 and 40 and the chain 42. The driving chain 26 is maintained in correct driving relation to the sprockets 38 and 24 by the use of an idler gear 44 which is supported on the upper surface of the frame 10 and engages the chain 26 to maintain the chain in taut condition.

Referring now more specifically to the right-hand portion of Figure 3 and Figures 5 and 6, it will be seen that a disc 46 is adjustably secured to the rear portion of the frame 10 by a vertical slidable depending bracket 48 having a pair of arms 50 and 52 which straddle the disc 46 and rotatably support same by a shaft 54 in the form of a pivot bolt. The bracket 48 is slidably received in an apertured bracket 56 and the upper end of the bracket 48 is slidably connected to a bell crank 58 that is pivotally secured to the frame 10 by a hinge pin 60 located in the center of a notched arcuate plate 62 which is engaged by a spring loaded member 64 operated by a handle 66 as shown in Figure 1 for raising and lower the member 64 against the action of spring 68 thereby raising and lowering the disc 46. Also pivotally secured to pivot shaft 54 and trailing behind the disc 46 are a pair of disc 70 which are rotatably journaled on a shaft 72 as best seen in Figure 6. The shaft 72 is supported by an arm 74 which is attached to the pivot shaft 54 and is urged downwardly about such shaft 54 by a pressure spring 76 which maintains the disc 70 in engagement with the ground surface as shown in Figure 2 wherein the vines which are pushed into the ground by disc 46 are covered by the discs 70 which taper towards each other at the point where they engage the ground. As clearly seen in Figure 6, the discs 70 are formed on their outer periphery with an edge which tapers towards the outside and in an obvious manner these discs 70 pull soil over the plants which have been pushed into the ground by disc 46.

As clearly seen in Figures 2 and 4, depending platforms 78 are secured along side each side of the frame 10 and placed along the frame 10 are a plurality of vine receiving boxes 80, which are at a convenient height for an operator standing on platform 78 to remove the vines from the box 80 and place them on the trough 36 as the drums rotate under the influence of the ground engaging wheels 12.

The operation of the device will be readily understood. The vine planter frame 10 is attached to some source of power, such as a tractor through the hitch 14 and is moved along the ground on the wheels 12 which rotate the axle 20 and the drive sprocket 24 secured to the axle 20 actuates the drive chain 26 thereby driving the drums 34 and the troughs 36 wherein an operator standing on the platform 78 may deposit vines from the boxes 80 onto a trough 36 and the vines are carried with the trough 36 and deposited on the row as thus shown in Figure 4 and the disc 46 engages the vines and pushes them into the upstanding rows a predetermined distance depending upon the setting of the adjusting handle 58 and the spring urged discs 70 throws the soil over the plants thereby assuring the rooting of the vines.

The boxes 80 may be changed for full boxes when the planter reaches the end of a row and the spacing of the vines on the rows may be effected by changing the relationship of the sizes of the drive sprockets and the driven sprockets. Obviously, the frame may be adjusted laterally along the axle 20 by moving the abutment members 22 and the frame may be adjusted vertically by placing the axle 20 in any of the selected apertures 18 thereby adapting the planter to be used on various height rows. If so desired, seats may be placed on the frame which projects over the platforms so that the operator may sit while depositing the vines on the troughs and a suitable index means such as different colored troughs may be used to facilitate a speedy trough loading operation.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A vine planter comprising a vertically adjustable mobile frame, a cylindrical drum rotatably supported on said frame and being driven in proportion to linear movement of the frame, vine receiving means disposed peripherally on said drum in circumferentially spaced relation for permitting vines to be deposited thereon when above the frame and depositing the vines in a longitudinal row below the frame with the vines being deposited in mutual spaced relation, means mounted on said frame in rearward longitudinal spaced relation to the drum for partially pushing the spaced vines into the soil, and covering means resiliently supported on and disposed rearwardly of the pushing means for partially covering the vines.

2. The combination of claim 1 wherein said vine pushing means includes a rotatable disc, bracket means mounting the disc on the frame for vertical adjustment for varying the depth to which the vines are pushed into the soil, said covering means including a pair of downwardly converging discs, a rearwardly extending arm pivotally supported from said bracket means, and spring means interconnecting the bracket means and arm for resiliently retaining the covering discs in predetermined relation to the pushing disc.

3. A vine planter comprising an elongated frame provided with a pair of support wheels, a pair of longitudinally extending platforms suspended from the frame and along each side thereof for receiving operators standing in facing relation to the frame, a pair of transverse shafts mounted on the upper surface of said frame in longitudinally spaced relation, an enlarged cylindrical drum rigid with each of said shafts, a plurality of circumferentially spaced trough members mounted rigidly on each of said drums in position for receiving manually positioned vines when facing upwardly and depositing the vines on the soil when facing downwardly, a pair of depending brackets on said frame, each bracket having vertically spaced apertures, an axle interconnecting said support wheels and journaled in one of the apertures in each bracket to permit change in the elevation of the frame and drums in relation to the ground surface, drive means interconnecting the axle and both of said drums for driving said drums in the same direction in proportion to the rate of forward movement of the frame, said frame including a plurality of unobstructed areas for receiving a plurality of vine supplying containers, a rearwardly extending support member on said frame, a vertically slidable bracket mounted on said support member, a vine pusher disc rotatably supported on the lower end of the slidable bracket, means interconnecting the slidable bracket and support member for locking the pusher disc in vertically adjusted position, a pair of vine covering discs supported from the lower end of said bracket in trailing relation and for swinging in a vertical plane, and spring means urging the covering discs into engagement with the soil for partially covering the vines disposed on the soil by the drums and pushed into the soil by the pusher disc.

References Cited in the file of this patent

UNITED STATES PATENTS

| | | |
|---|---|---|
| 1,760,128 | Enz | May 27, 1930 |
| 2,369,983 | Rodli | Feb. 20, 1945 |
| 2,422,832 | Hershey | June 24, 1947 |
| 2,473,261 | Ruhl | June 14, 1949 |
| 2,719,498 | Goolsby | Oct. 4, 1955 |
| 2,754,622 | Rohnert | July 17, 1956 |

FOREIGN PATENTS

| | | |
|---|---|---|
| 655,550 | France | Dec. 18, 1928 |
| 269,600 | Italy | Nov. 23, 1929 |
| 280,547 | Italy | Dec. 12, 1930 |

OTHER REFERENCES

Publication: Agricultural Engineering, September 1947. Page 415, "Sweet Potato Planting Machinery."